United States Patent
Barnes et al.

(10) Patent No.: US 7,520,259 B2
(45) Date of Patent: Apr. 21, 2009

(54) POWER MANAGEMENT SYSTEM FOR FUEL INJECTED ENGINE

(75) Inventors: Travis E. Barnes, Metamora, IL (US); Stephen R. Lewis, Chillicothe, IL (US); W. John Love, Dunlap, IL (US); Timothy J. Matzke, El Paso, IL (US); Kevin L. Dea, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 66 days.

(21) Appl. No.: 11/443,100

(22) Filed: May 31, 2006

(65) Prior Publication Data

US 2007/0277777 A1 Dec. 6, 2007

(51) Int. Cl.
*F02B 3/00* (2006.01)
*G06F 17/00* (2006.01)

(52) U.S. Cl. .............. 123/299; 123/478; 123/480; 701/104

(58) Field of Classification Search ........... 123/299, 123/300, 478, 480, 490; 701/102, 103, 104, 701/105, 113
See application file for complete search history.

(56) References Cited

U.S. PATENT DOCUMENTS

| | | | | |
|---|---|---|---|---|
| 5,161,510 A | * | 11/1992 | Yamada | ............ 123/494 |
| 6,453,874 B1 | | 9/2002 | Duffy et al. | |
| 6,470,849 B1 | * | 10/2002 | Duffy et al. | ............ 123/299 |
| 6,539,901 B2 | | 4/2003 | Nishida et al. | |
| 6,651,618 B1 | | 11/2003 | Coleman et al. | |
| 6,848,414 B2 | * | 2/2005 | West et al. | ............ 123/299 |
| 7,201,127 B2 | * | 4/2007 | Rockwell et al. | ............ 123/299 |
| 2005/0126535 A1 | | 6/2005 | Nishimaki | |

FOREIGN PATENT DOCUMENTS

| | | |
|---|---|---|
| EP | 1 344 922 A2 | 9/2003 |
| EP | 1 484 494 A2 | 12/2004 |
| EP | 1 484 494 A3 | 5/2005 |
| EP | 1 344 922 A3 | 6/2006 |
| JP | 9-60541 | 3/1997 |
| WO | WO 07/011463 A1 | 1/2007 |

OTHER PUBLICATIONS

Notification of Transmittal of the International Search Report and the Written Opinion of the International Searching Authority, International Search Report, and Written Opinion of the International Searching Authority, PCT/US2007/009317, 12 pages, mailed Sep. 27, 2007.

* cited by examiner

*Primary Examiner*—T. M Argenbright
(74) *Attorney, Agent, or Firm*—Finnegan, Henderson, Farabow, Garrett & Dunner

(57) ABSTRACT

A power management system for a combustion engine is disclosed. The power management system has a fuel injector, a sensor, and a controller in communication with the sensor and the fuel injector. The fuel injector is operable to inject multiple shots of fuel into the combustion engine during a single injection event. The sensor is configured to sense a speed of the combustion engine and generate a signal indicative of the sensed speed. The controller is configured to limit the number of shots per injection event in response to the signal.

22 Claims, 2 Drawing Sheets

POWER MANAGEMENT SYSTEM FOR FUEL INJECTED ENGINE

TECHNICAL FIELD

The present disclosure is directed to a power management system and, more particularly, to a power management system for use in a fuel injected engine.

BACKGROUND

An internal combustion engine typically includes at least one cylinder that receives a piston to form a combustion chamber. The piston is connected to a crankshaft such that a rotation of the crankshaft results in a corresponding reciprocating motion of the piston within the cylinder. Intake and exhaust valves associated with each combustion chamber are indirectly connected to the same crankshaft by way of a timing device such that a rotation of the crankshaft results in corresponding opening and closing movements of the intake and exhaust valves. Thus, the movements of engine valves and the motion of an associated piston, because of their connections to a common crankshaft, are synchronized.

The timing of the opening and closing movements of the intake and exhaust valves relative to the reciprocating motion of the piston affects performance of the engine. However, this timing of the engine is typically fixed according to a predicted general application of the engine. If operating in a manner other than that predicted, resulting performance of the engine can be less than desired.

In order to maximize the performance of the engine for a variety of applications, it can be beneficial to adjust the relative timing between the movements of the engine valves and the motion of the piston. This relative timing can be accomplished by way of a variable valve actuation device that selectively breaks the link between movement of the engine valves and rotation of the crankshaft. These variable valve actuation devices are typically electronically controlled, and often electronically actuated.

During operation of the engine described above, fuel may be injected into the combustion chamber and the injection synchronized with the reciprocating motion of the piston. For example, fuel may be injected as the piston nears a top-dead-center position in a compression stroke to allow for compression-ignited-combustion of the injected fuel. Alternatively, fuel may be injected as the piston begins the compression stroke heading toward a top-dead-center position for homogenous charge compression ignition operation. Fuel may also be injected as the piston is moving from a top-dead-center position towards a bottom-dead-center position during an expansion stroke for a late post injection to create a reducing atmosphere for aftertreatment regeneration. In order to accomplish these specific injection events, the engine is usually equipped with a fuel injector. The fuel injector is typically electronically controlled and often electronically actuated.

One example of an engine having an electronically controlled variable valve actuation device and an electronically controlled fuel injector is described in U.S. Pat. No. 6,651,618 (the '618 patent) issued to Coleman et al. on Nov. 25, 2003. The '618 patent describes an internal combustion engine having an intake valve assembly, a camshaft arranged to cyclically operate the intake valve assembly, and a variable intake valve closing mechanism arranged to interrupt the cyclical movement of the intake valve assembly. The internal combustion engine also includes a unit injector utilized to spray fuel into a cylinder of the internal combustion engine. The internal combustion engine further includes a controller electrically connected to the variable intake valve closing mechanism and the unit injector to power and control operation of the variable intake valve closing mechanism and the unit injector.

One problem associated with this type of arrangement may include power management. In particular, during certain operations of the internal combustion engine, such as at high engine speeds when multiple injections of fuel are required and when variable valve timing is simultaneously desired, the power supply of the controller may be insufficient to meet the electrical demands of both the fuel injector and the variable intake valve closing mechanism. In these situations, because the supply of power is insufficient to meet the power demands, the operation of both the fuel injector and the variable intake valve closing mechanism may be negatively affected, resulting in poor and/or unpredictable performance of the engine.

The power management system of the present disclosure solves one or more of the problems set forth above.

SUMMARY OF THE DISCLOSURE

In one aspect, the present disclosure is directed to a power management system for a combustion engine. The power management system includes a fuel injector, a sensor, and a controller in communication with the sensor and the fuel injector. The fuel injector is operable to inject multiple shots of fuel into the combustion engine during a single injection event. The sensor is configured to sense a speed of the combustion engine and generate a signal indicative of the sensed speed. The controller is configured to limit the number of shots per injection event in response to the signal.

In another aspect, the present disclosure is directed to a method of managing power supplied to a fuel injector. The method includes electronically controlling a fuel injector to inject multiple shots of fuel into an engine during a single injection event. The method further includes sensing a speed of the engine, and limiting the number of shots in response to the sensed speed.

DETAILED DESCRIPTION

Figure 1:
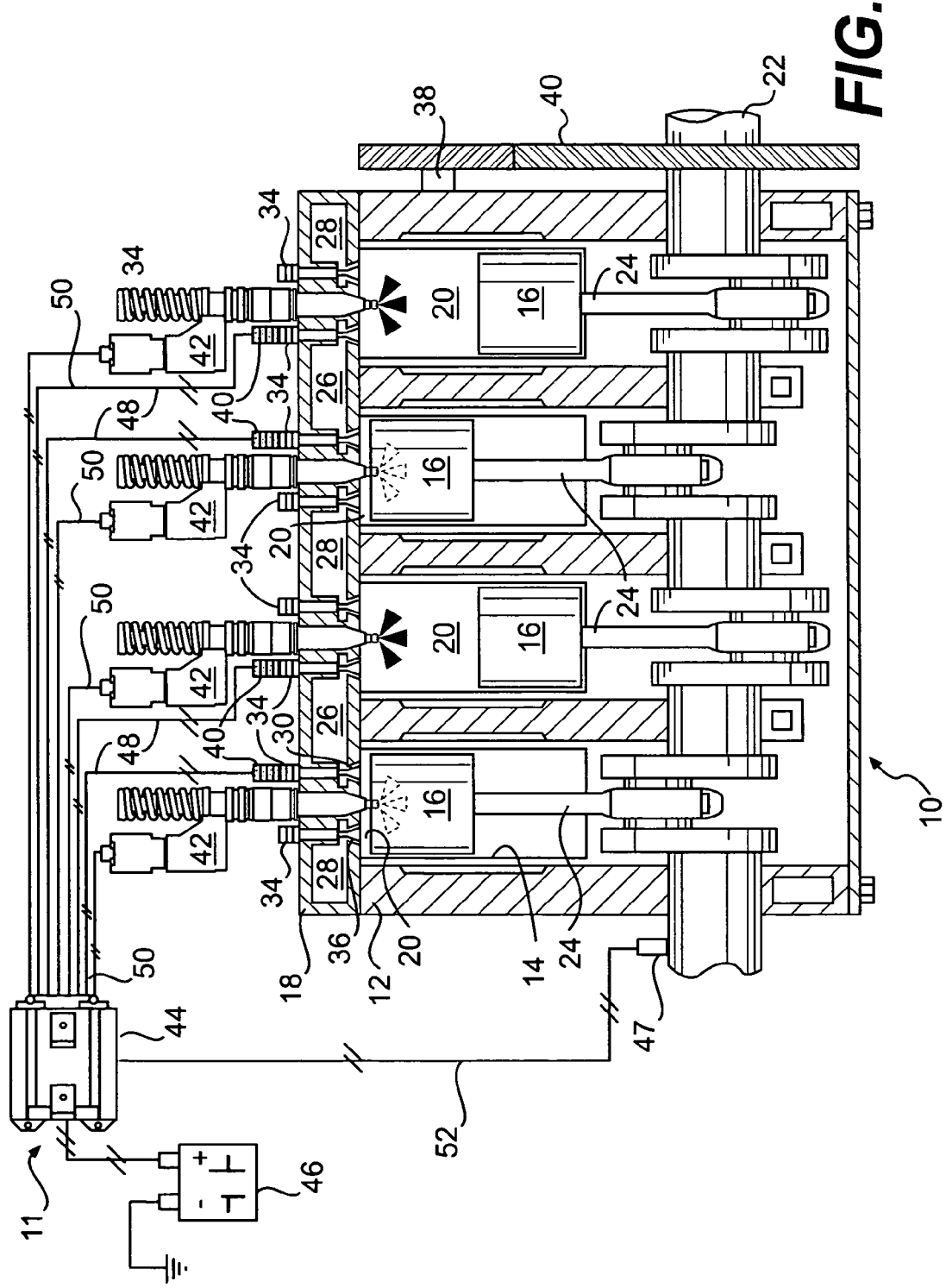
FIG. 1 is a schematic illustration of an exemplary disclosed engine.

FIG. 1 illustrates an exemplary embodiment of a power source 10 having a control system 11. For the purposes of this disclosure, power source 10 is depicted and described as a four-stroke engine. One skilled in the art will recognize that power source 10 may embody any type of internal combustion engine such as, for example, a diesel engine, a gasoline engine, a gaseous fuel-powered engine, or any other suitable type of engine. Power source 10 may include an engine block 12 that defines a plurality of cylinders 14.

A piston 16 and a cylinder head 18 may be associated with each cylinder 14 to form a combustion chamber 20. Specifically, piston 16 may be slidably disposed within each cylinder 14 to reciprocate between a top-dead-center position and a bottom-dead-center position. Cylinder head 18 may be positioned to cap off an end of cylinder 14, thereby forming a combustion chamber 20. In the illustrated embodiment, power source 10 includes four combustion chambers 20. However, it is contemplated that power source 10 may include a greater or lesser number of combustion chambers 20 and that combustion chambers 20 may be disposed in an "in-line" configuration, a "V" configuration, or in any other suitable configuration.

Power source 10 may also include a crankshaft 22 rotatably disposed within engine block 12. A connecting rod 24 may connect each piston 16 to crankshaft 22 so that a sliding motion of piston 16 between the top-dead-center and bottom-dead-center positions within each respective cylinder 14 results in a rotation of crankshaft 22. Similarly, a rotation of crankshaft 22 may result in a sliding motion of piston 16 between the top-dead-center and bottom-dead-center positions. In a four-stroke engine, piston 16 may reciprocate between the top-dead-center and bottom-dead-center positions through an intake stroke, a compression stroke, a combustion or power stroke, and an exhaust stroke.

Cylinder head 18 may define an intake passageway 26 and an exhaust passageway 28 associated with each combustion chamber 20. Intake passageway 26 may direct air into combustion chamber 20. Exhaust passageway 28 may direct exhaust gases from combustion chamber 20 to the atmosphere.

An intake valve 30 may be disposed within an intake opening of passageway 26 to selectively engage a seat. Specifically, intake valve 30 may be movable between a first position at which intake valve 30 engages the seat to prevent a flow of fluid through the intake opening, and a second position at which intake valve 30 is removed from the seat to allow a flow of fluid through the intake opening into combustion chamber 20.

A series of valve actuation assemblies 34 may be operatively engaged with cylinder head 18 to move intake valve 30 between the first and second positions. Another valve actuation assembly 34 may be provided to move an exhaust valve 36 between the first and second positions, if desired. It should be noted that each cylinder head 18 could include multiple intake openings and multiple exhaust openings. Each such opening would have an associated valve. Power source 10 may include a valve actuation assembly 34 for each cylinder head 18 that is configured to actuate all of the intake valves 30 or all of the exhaust valves 36 of that cylinder head 18. It is also contemplated that a single valve actuation assembly 34 could actuate the intake valves 30 associated with multiple cylinder heads 18, if desired. One or more of valve actuation assembly 34 may be associated with a common cam assembly 38 or other means for inducing the cyclical movement between the first and second positions.

Cam assembly 38 may operatively connect intake and/or exhaust valves 30, 36 to crankshaft 22 of power source 10 in any manner readily apparent to one skilled in the art where a rotation of crankshaft 22 results in a corresponding motion of the connected valves. For example, cam assembly 38 may connect to crankshaft 22 through a gear train 39 that increases the rotational speed of cam assembly 38 to approximately one half of the rotational speed of crankshaft 22. Alternatively, cam assembly 38 may connect to crankshaft 22 through a chain, a belt, or in any other appropriate manner. Cam assembly 38 may include at least one cam lobe (not shown), the shape of which may determine, at least in part, the actuation timing and lift of intake and/or exhaust valves 30, 36 during an operation of power source 10.

Intake and/or exhaust valves 30, 36 may follow the profile of cam assembly 38 as it rotates. In particular, intake and/or exhaust valves 30, 36 may directly or indirectly through the use of a cam follower, push rod, or other similar device, engage and follow the profile of the cam assembly's lobe to rise and lower in response to the lobes rotation. Thus, the rotation of cam assembly 38 may cause intake and/or exhaust valves 30, 36 to move from the first position to the second position to create a specific lift pattern associated with the profile of the cam lobe.

As also illustrated in FIG. 1, an electronically operated variable valve actuator 40 (VVA) may be associated with intake and/or exhaust valves 30, 36. VVA 40 may be structured and arranged to selectively interrupt the cyclical movement of intake and/or exhaust valves 30, 36 initiated by cam assembly 38. For example, VVA 40 may include any device directly or indirectly coupled to intake and/or exhaust valves 30, 36 to selectively move the corresponding valve to and/or hold the valve in a flow passing position for an extended period of time. In this manner, engine functions such as, for example, internal exhaust gas recirculation (EGR), engine braking, Miller cycle operation, and other similar functions may be facilitated. Other examples of VVA 40 that could provide similar function may include phase shifting devices operatively connected to cam assembly 38 to selectively adjust the relative rotation between crankshaft 22 and cam assembly 38, adjustable cam followers operable to change cam lift or switch driving motion between multiple cams or cam lobes, and other similar devices known in the art.

Power system 10 may also include a fuel injector 42 associated with each combustion chamber 20. In particular, each fuel injector 42 may be disposed within a cylinder head 18 and operable to inject an amount of pressurized fuel into the associated combustion chamber 20 at predetermined timings, fuel pressures, and quantities. Fuel injector 42 may embody any type of electronically controlled fuel injection device such as, for example, an electronically actuated—electronically controlled injector, a mechanically actuated—electronically controlled injector, a digitally controlled fuel valve associated with a high pressure common rail, or any other type of fuel injector known in the art.

The timing of fuel injection into combustion chamber 20 may be synchronized with the motion of piston 16 reciprocatingly disposed therein. For example, fuel may be injected as piston 16 nears a top-dead-center position in a compression stroke to allow for compression-ignited-combustion of the injected fuel. Alternatively, fuel may be injected as piston 16 begins the compression stroke heading towards a top-dead-center position for homogenous charge compression ignition operation. Fuel may also be injected as piston 16 is moving from a top-dead-center position towards a bottom-dead-center position during an expansion stroke for a late post injection to create a reducing atmosphere for aftertreatment regeneration. In most situations, one or more shots of fuel may be injected into combustion chamber 20 during each 720 degree revolution of crankshaft 22. This combination of fuel shots during a single complete cycle or two revolutions of crankshaft 22 may be known as an injection event. The electronic command signal sent to fuel injectors 42 that results in a particular combination of fuel injection shots may be considered a current waveform.

Control system 11 may power and control operation of VVA 40 and each fuel injector 42 based one or more input. In particular, control system 11 may include a controller 44, a power storage device 46, and a speed sensor 47. Controller 44 may selectively direct current to VVAs 40 by way of a plurality of communication lines 48, and current waveforms to fuel injectors 42 by way of a plurality of communication lines 50, in response to a signal from speed sensor 47 received via a communication line 52. Controller 44 may be configured to vary valve actuation by applying a determined current to one or all of VVAs 40 and vary fuel injection characteristics such as injection timing, pressure, and amount, by applying a determined current waveform or sequence of determined current waveforms to each fuel injector 42, based on input from speed sensor 47. As current is directed from controller 44 to fuel injectors 42 and VVAs 40, the power available from power storage device 46 may be consumed. Controller 44 may be configured to monitor the power available from power storage device 46 by way of, for example, a sensor (not shown). The sensor may be internal to controller 44 or, alternatively, may embody a stand alone device connected to controller 44 by way of a communication link (not shown).

Controller 44 may embody a single microprocessor or multiple microprocessors that include a means for controlling an operation of VVAs 40 and fuel injectors 42. Numerous commercially available microprocessors can be configured to perform the functions of controller 44. It should be appreciated that controller 44 could readily embody a general power source microprocessor capable of controlling numerous power source functions. Controller 44 may include all the components required to run an application such as, for example, a memory, a secondary storage device, and a processor, such as a central processing unit or any other means known in the art for controlling VVAs 40 and fuel injectors 42. Various other known circuits may be associated with controller 44, including power supply circuitry, signal-conditioning circuitry, solenoid driver circuitry, communication circuitry, and other appropriate circuitry.

One or more maps relating power source speeds, power storage supply voltage, VVA operation, Injector operation, and acceptable operation of power source 10 may be stored in the memory of controller 44. Each of these maps may be in the form of tables, graphs, and/or equations. In one example, power source speed, load, and/or other power source parameter, injector operation, and a minimum threshold voltage supplied to VVAs 40 may form the coordinate axis of a 2 or 3-D table used for ensuring that operation of power source 10 always remains compliant with emission laws. In this manner, controller 44 may determine a ratio of injector shot limitation and power supply reduction to VVAs 40 that results in the appropriate power consumption level without sacrificing engine emissions.

Power storage device 46 may embody any device configured to store and conduct power. For example, power storage device 46 may embody one or more batteries, capacitors, or a combination of batteries and capacitors that may be charged through the use of a power generating device such as an onboard alternator. It is contemplated that a power booster may be located between power storage device 46 and controller 44, if desired, to boost the voltage level of the power supplied to VVAs 40, fuel injectors 42, and controller 44. It is further contemplated that power storage device 46 may alternatively embody the power generating device described above, without having the capacity to store the generated power, if desired.

Speed sensor 47 may sense a rotational speed of power source 10. For example, speed sensor 47 may embody a magnetic pickup sensor configured to sense a rotational speed of crankshaft 22 and produce a corresponding speed signal. Speed sensor 47 may be disposed proximal a magnetic element (not shown) embedded within crankshaft 22, proximal a magnetic element (not shown) embedded within a component directly or indirectly driven by crankshaft 22, or disposed in other suitable manner to produce a signal corresponding to the rotational speed of the resulting magnetic field. The speed signal may be sent from speed sensor 47 to controller 44 by way of communication line 52.

Figure 2:
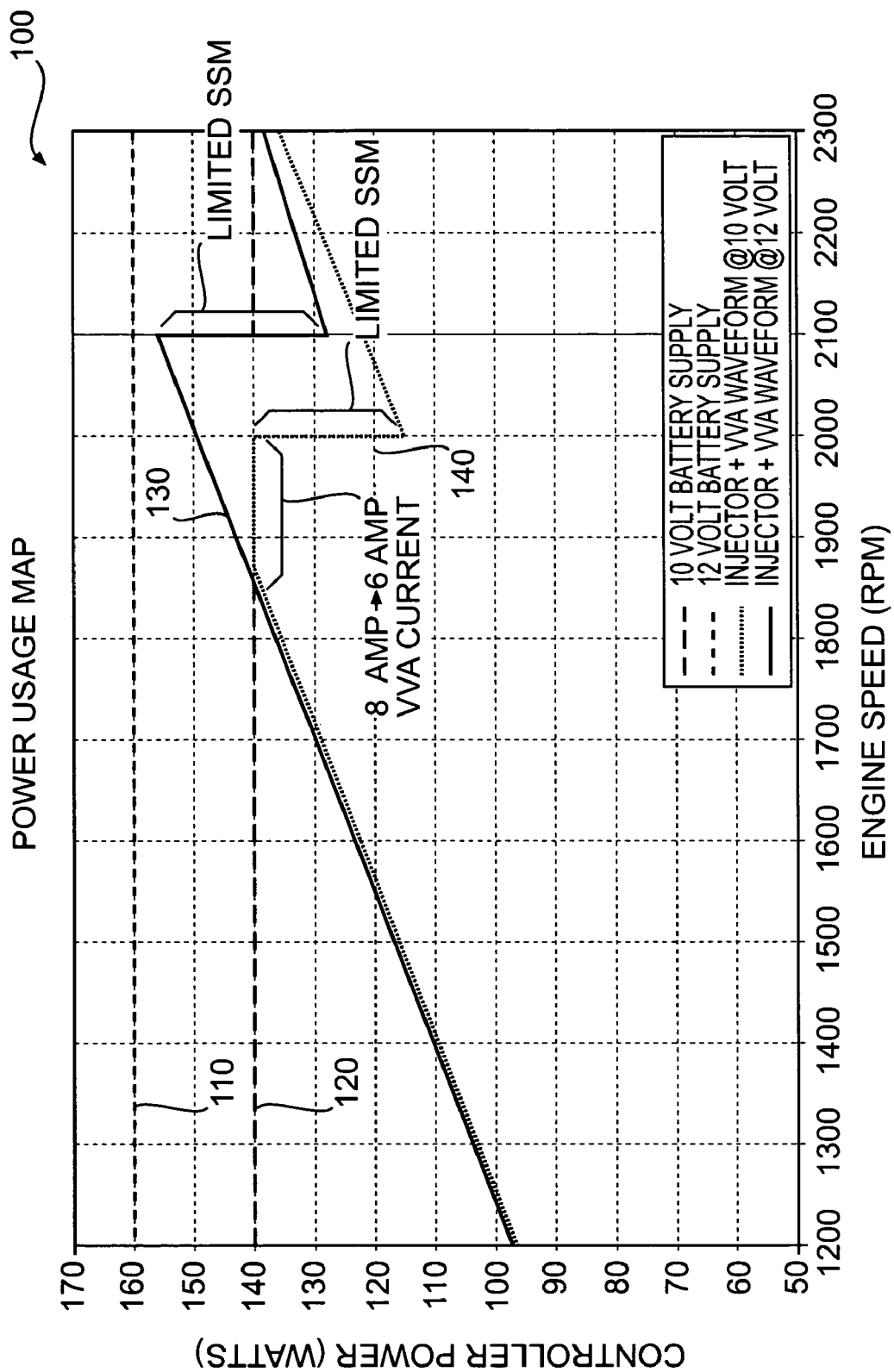
FIG. 2 is an exemplary disclosed control map for use with the engine of FIG. 1.

FIG. 2 illustrates an exemplary control map 100 for use in managing the power supplied by storage device 46. FIG. 2 will be discussed in the following section to further illustrate the disclosed system and its operation.

INDUSTRIAL APPLICABILITY

The disclosed power management system may be applicable to any fuel injected power source where the power supplied to the fuel injector(s) of the power source requires regulation. In particular, the disclosed system may improve performance of the power source by ensuring that sufficient power is always available to the fuel injector(s). The operation power source 10 will now be explained.

As illustrated in the control map 100 of FIG. 2, the operation of VVA 40 and fuel injector 42 may be altered in response to an available power from power storage device 46. In particular, control map 100 includes a first curve 110, a second curve 120, a third curve 130, and a fourth curve 140. First curve 110 may be representative of a first power level available from power storage device 46 such as, for example, 12 volts. Second curve 120 may be representative of a second power level available from power storage device 46 that is less than the first power level such as, for example, 10 volts. Third curve 130 may be representative of a power amount consumed by VVAs 40 and fuel injectors 42 as power source 10 traverses between a low speed and a high speed at the first power level. Fourth curve 140 may be representative of a power amount consumed by VVAs 40 and fuel injectors 42 as power source 10 traverses between the low speed and the high speed at the second power level.

During operation of power source 10, if the amount of power demanded by VVAs 40 and fuel injectors 42 exceeds the amount of power available from power source 46, the operation of VVAs 40 and fuel injectors 42 may deviate from a desired operation. To prevent the demand from exceeding the supply and the subsequent deviant operation, controller 44 may selectively limit operation of VVAs 40 and/or fuel injectors 42. As can be seen from third curve 130, operation of fuel injector 42 may be limited as the speed of power source 10 increases. Specifically, as the speed of power source 10 increases past a predetermined speed, as sensed by speed sensor 47, fuel injectors 42 may be limited to a single injection shot per injection event. In one exemplary embodiment, the predetermined speed may be about 2100 rpm.

The operation of fuel injector 42 may be limited to reduce the amount of electrical power consumed by power source 10. In particular, as the speed of power source 10 increases, the number of fuel injection events per give period of time may likewise increase. Because each injection event and each injection shot within each injection event requires some amount of power from power storage device 46, the increased number of injection events per period of time could result in a power demand that exceeds the capacity of power storage device 46 to supply power. By limiting the number of shots per injection event at these high speeds, the power amount demanded and consumed by fuel injectors 42 may be likewise reduced.

As the supply of power from power storage device 46 diminishes, additional power saving measures may be taken. In particular, as the output of power storage device decreases toward the second power level, the speed at which multiple injection shots are prevented may be reduced. In one exemplary embodiment, as the power available from power storage device 46 approaches the second power level, the speed at which fuel injectors 42 are limited to a single injection shot per injection event may be reduced from about 2100 rpm to about 2000 rpm.

The current waveform supplied to control VVA 40 may also be affected during times of low power supply. Specifically, as the output of power storage device 46 decreases toward the second power level, the amount of current supplied to VVA 40 may be reduced. In one exemplary embodiment, the maximum current directed to VVA 40 may be gradually reduced from about 8 amps to about 6 amps based on the speed of power source 10 and the voltage of power available from storage device 46. In this same example, when the output of power storage device 46 is reduced to the second power level of about 10 volts and as power source 10 increases speed from about 1850 rpm to about 2000 rpm, the maximum voltage directed to VVA 40 may be reduced from about 8 amps to about 6 amps such that the total power consumed by all of VVAs 40, fuel injectors 42, and controller 44 remains substantially constant at the about the same level available from power storage device 46. The reduction of current may be controlled by way of a relationship equation or map stored within the memory of controller 44 that uses power supply voltage and power source speed as input.

Control system 11 may ensure minimal power source operation, even during times of low power supply. In particular, as the power supply available from power storage device 46 reduces below a maximum power amount consumable by power source 10, controller 44 may reduce the power consumed by power source 10 in such a manner that predictable continued operation of power source 10 may be ensured. Specifically, even though fuel injectors 42 may only be allowed to inject a single shot of fuel per injection event, it may be ensured that fuel injectors 42 can always inject at least a single shot. In addition, although the current directed to VVA 40 may be reduced from about 8 amps to about 6 amps, the current should still be great enough to sufficiently vary the actuation of intake and/or exhaust valves 30, 36. And, even if the current directed to VVAs 40 is insufficient to vary the actuation of intake and/or exhaust valves 30, 36, the valves may still be actuated in the cyclical manner by way of cam assembly 38.

Controller 44 may also ensure that exhaust emissions remain compliant with emission regulations, even when implementing power reduction strategies. For example, during situations of low power supply, controller 44 may determine the correct ratio of injection shot limitation and power supply reduction to VVAs 40 that results in the required reduced power consumption level and simultaneously ensures compliance with emission regulations. In some circumstances, the power supplied to VVAs 40 may not be reduced below an emission compliant minimum threshold value. In these circumstances, controller 44 may, instead of reducing the level of power supplied to VVAs 40, limit the number of shots per injection event, even if the speed of power source 10 has not dropped below the predetermined speeds described above (e.g., 2000 rpm and 2100 rpm).

It will be apparent to those skilled in the art that various modifications and variations can be made to the disclosed power management system. Other embodiments will be apparent to those skilled in the art from consideration of the specification and practice of the disclosed power management system. For example, it is contemplated that controller 44 may alternatively or additionally control the amount of power supplied to a non-fuel injector engine device other than a variable valve actuator such as, among other things, a particular regeneration system. It is intended that the specification and examples be considered as exemplary only, with a true scope being indicated by the following claims and their equivalents.

What is claimed is:

1. A power system, comprising:
   an engine block forming at least one combustion chamber;
   a crankshaft rotationally disposed within the engine block;
   an engine valve operatively connected to the crankshaft to cyclically open and close a fluid passageway;
   a variable valve actuation device configured to selectively interrupt the cyclical opening and closing movement of the engine valve;
   a fuel injector operable to inject multiple shots of fuel into the at least one combustion chamber during a single injection event;
   a sensor configured to sense a rotational speed of the power system and generate a signal indicative of the sensed speed; and
   a controller in communication with the sensor, the fuel injector, and variable valve actuation device, the controller being configured to:
     limit the number of shots per injection event in response to the signal; and
     reduce power supplied to the variable valve actuation device in response to a power available to the controller, the fuel injector, and the variable valve actuation device falling below a predetermined value.

2. The power system of claim 1, wherein the number of shots per injection event is limited to one when the signal indicates a sensed speed of the power system in excess of a predetermined speed.

3. The power system of claim 2, wherein the predetermined speed is about 2100 rpm.

4. The power system of claim 2, wherein the predetermined speed is reduced in response to a level of power available to the controller, injector, and variable valve actuation device.

5. The power system of claim 1, wherein the power supplied to the variable valve actuation device is reduced at a rate based on the power available and the signal.

6. The power system of claim 5, wherein the reduction rate retains a combined power consumption of the controller, the injector, and the variable valve actuation device constant at an available power level as the speed of the power system varies.

7. A power management system for a combustion engine, comprising:
   a fuel injector operable to inject multiple shots of fuel into the combustion engine during a single injection event;
   a power source configured to provide power to the fuel injector and to a device other than the fuel injector;
   a controller in communication with the power source and the fuel injector, the controller being configured to reduce power to the device to provide power to the fuel injector; and
   a sensor configured to sense a speed of the combustion engine and generate a signal indicative of the sensed speed,
   wherein the controller is in communication with the sensor and is configured to limit the number of shots per injection event in response to the signal.

8. The power management system of claim 7, wherein the number of shots per injection event is limited to one when the signal indicates a sensed speed of the combustion engine in excess of a predetermined speed.

9. The power management system of claim 8, wherein the predetermined speed is about 2100 rpm.

10. The power management system of claim 8, wherein the predetermined speed is reduced in response to a level of power available to the controller and the fuel injector.

11. The power management system of claim 7, wherein the controller is further configured to reduce power supplied to the device in response to a power available to the controller, the fuel injector, and the device falling below a predetermined value.

12. The power management system of claim 11, wherein the device includes a variable valve actuation mechanism in communication with the controller.

13. The power management system of claim 12, wherein an amount of power reduction is limited to a minimum threshold value corresponding with an exhaust emission level.

14. The power management system of claim 12, wherein the controller is further configured to determine a ratio of injection shot limitation and variable valve actuation power reduction that results in a desired power consumption level and an acceptable exhaust emission level.

15. The power management system of claim 11, wherein the power supplied to the device is reduced at a rate based on the power available and the signal.

16. The power management system of claim 11, wherein the reduction rate retains a combined power consumption of the controller, the fuel injector, and the device substantially constant at an available power level as the speed of the combustion engine varies.

17. A method of managing power supplied to a fuel injector and a device other than the fuel injector, comprising:

electronically controlling the fuel injector to inject multiple shots of fuel into an engine during a single injection event;

selectively diverting power from the device to the fuel injector to allow the fuel injector to inject the multiple shots of fuel into the engine during the single injection event;

sensing a speed of the engine; and limiting the number of shots in response to the sensed speed.

18. The method of claim 17, wherein limiting includes limiting the number of shots per injection event to one, in response to the sensed speed exceeding a predetermined speed.

19. The method of claim 18, wherein the predetermined speed is about 2100 rpm.

20. The method of claim 18, further including reducing the predetermined speed in response to a level of power available to the fuel injector.

21. The method of 17, further including reducing the power supplied to the device in response to a sensed power available to the fuel injector.

22. The method of claim 21, wherein reducing includes reducing the power supplied to the device at a rate based on the sensed power available and the sensed speed of the engine.

* * * * *